United States Patent
Konno et al.

[11] Patent Number: 6,031,686
[45] Date of Patent: *Feb. 29, 2000

[54] DISK DRIVE WITH REINFORCED FRAME PLATE STRUCTURE MADE OF TWO THIN METAL PLATES ADHERED TOGETHER, AND A REINFORCING BEAD FORMED THEREON

[75] Inventors: Makoto Konno, Mogami-gun; Hisashi Shibata, Yamagata, both of Japan

[73] Assignee: Mitsumi Electric Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/993,279

[22] Filed: Dec. 18, 1997

[30] Foreign Application Priority Data

Dec. 27, 1996 [JP] Japan ................................ 8-358322

[51] Int. Cl.[7] .......................... G11B 33/00; G11B 17/04
[52] U.S. Cl. ................................... 360/99.01; 360/97.04; 369/75.1
[58] Field of Search ........................ 360/97.01, 99.06, 360/105, 99.01, 97.02, 97.04; 369/75.1

[56] References Cited

U.S. PATENT DOCUMENTS

| | | | |
|---|---|---|---|
| 5,172,286 | 12/1992 | Jurgenson | 360/104 |
| 5,214,549 | 5/1993 | Baker et al. | 360/97.02 |
| 5,225,949 | 7/1993 | King et al. | 360/104 |
| 5,235,482 | 8/1993 | Schmitz | 360/97.02 |
| 5,282,099 | 1/1994 | Kawagoe et al. | 360/97.01 |
| 5,365,388 | 11/1994 | Maughan et al. | 360/97.01 |
| 5,414,574 | 5/1995 | Boutaghou et al. | 360/97.01 |
| 5,483,397 | 1/1996 | Gifford et al. | 360/97.02 |
| 5,492,163 | 2/1996 | Allendorfer | 160/32 |
| 5,551,145 | 9/1996 | Jurgenson | 360/97.01 |
| 5,552,946 | 9/1996 | Bicknese et al. | 360/97.01 |
| 5,805,378 | 9/1998 | Konno et al. | 360/97.01 |

*Primary Examiner*—Brian E. Miller
*Attorney, Agent, or Firm*—Frishauf, Holtz, Goodman, Langer & Chick, P.C.

[57] ABSTRACT

A disk drive comprises a frame plate having a principal surface on which a receiving portion for receiving a disk and a recording/reproducing unit for carrying out recording/reproducing operations onto and from the disk are provided. The frame plate comprises a metal thin plate and has a rear surface to which a thin reinforcing plate substantially equal in length and width to the frame plate is adhered.

17 Claims, 5 Drawing Sheets

DISK DRIVE WITH REINFORCED FRAME PLATE STRUCTURE MADE OF TWO THIN METAL PLATES ADHERED TOGETHER, AND A REINFORCING BEAD FORMED THEREON

BACKGROUND OF THE INVENTION

The present invention relates to a disk drive for carrying out data writing/reading operations onto and from a disk such as a flexible magnetic disk and a magnetooptic disk.

1. Field of the Invention

A magnetic disk drive as one of various types of disk drives comprises a head carriage movably holding a magnetic head for carrying out data writing/reading operations onto and from a magnetic disk, a moving mechanism for moving the head carriage in a predetermined radial direction with respect to the magnetic disk, a disk table for holding and rotating the magnetic disk, a rotation drive mechanism for driving the disk table, and a loading mechanism for loading and unloading the magnetic disk through a disk slot onto and from the disk table, respectively. The magnetic disk drive further comprises a main printed wiring board with various circuit components mounted thereon, a subsidiary printed wiring board with the rotation drive mechanism and the disk table mounted thereon, and a frame plate to which the main and the subsidiary printed wiring boards are attached.

The frame plate is typically formed by die-casting an aluminum material taking its mechanical strength into consideration. However, it is a recent trend to form the frame plate by pressing an iron plate. The frame plate made of the iron plate must be as thick as 1–1.2 mm in order to assure sufficient mechanical strength. This imposes a limitation upon reduction in weight.

2. Description of the Related Art

Referring to FIG. 1, a conventional magnetic disk drive will be described. The magnetic disk drive comprises a frame plate 11 and a cover member 12 made of a thin metal plate covering the frame plate 11. A combination of the frame plate 11 and the cover member 12 forms a hollow receiving space for receiving a magnetic disk (not shown). The magnetic disk has an access region for data write/read operations which are carried out when the magnetic disk is received in the receiving space.

In front of the receiving space, a front bezel 13 is assembled to guide the magnetic disk into the receiving space in a proper attitude. The front bezel 13 has a slot 13a. In the receiving space, an ejection plate 14 and a disk holder unit 15 are arranged. When the magnetic disk is inserted into the receiving space through the slot 13a, the magnetic disk is held by the disk holder unit 15 at a predetermined position with its lower and upper surfaces faced to the election plate 14 and the disk holder unit 15, respectively.

A head carriage 16 and an ejection lever 18 are also arranged in the receiving space. The head carriage 16 has a magnetic head 17 to be faced to a window of the magnetic disk when the magnetic disk is located at the predetermined position. The ejection lever 18 has a rotation shaft 18a pivotally supported on the frame plate 11 and an arm 18b extending from the rotation shaft 18a in one direction. The ejection lever 18 is urged by an ejection lever spring 18c and is rotatable around the rotation shaft 18a in a plane parallel to the surface of the frame plate 11.

On the frame plate 11, various mechanical components are mounted in addition to the ejection lever 18 and the head carriage 16. Specifically, those mechanical components include a disk table 19 for rotating the magnetic disk, a stepping motor 20 for moving the head carriage 16 back and forth, a guide bar 21 for guiding the movement of the head carriage 16, and a guide bar clamp 22 for clamping the guide bar 21. To the lower or rear surface of the frame plate 11, a main printed board and a subsidiary printed board as components of the magnetic disk drive are fixed through screws, although not shown in the figure. On the main printed wiring board, electric circuit components for data writing/reading operations are mounted. On the subsidiary printed wiring board, a motor for rotating the disk table 19 and a drive circuit for driving the motor are mounted. The main and the subsidiary printed wiring boards are covered with a lower cover member (not shown).

When an ejection button 23 protruding outside of the front bezel 13 is slightly depressed into the receiving space, the ejection plate 14 slightly moves backward to rotate the ejection lever 18.

The magnetic disk itself received in the receiving space is locked by a locking mechanism (not shown) to be prevented from undesirably escaping from the receiving space. The lock of the magnetic disk by the locking mechanism is released when the ejection button 23 is pushed. In this event, the ejection lever 18 is rotated by the urging force of the ejection lever spring 18c to push the magnetic disk. As a result, the magnetic disk is ejected from the receiving space to partially protrude outward through the slot 13a formed in the front bezel 13. The ejection plate 14 has an ejection spring 14a as a spring mechanism. When the ejection button 23 is released from the depressing force, the election plate 14 is forced by the ejection spring 14a to return to its original position. Thus, the magnetic disk can be taken out from the receiving space.

As is obvious from the foregoing, the magnetic disk drive has a structure in which the mechanical components for data writing/reading operations are arranged on the upper or principal surface of the frame plate 11 while the electric circuit components on the printed wiring boards are arranged on the lower surface.

The frame plate 11 is typically formed by die-casting an aluminum material, taking its mechanical strength into consideration. However, it is a recent trend to form the frame plate by pressing an iron plate. The frame plate made of the iron plate mast be as thick as 1–1.2 mm in order to assure sufficient mechanical strength. This imposes a limitation upon reduction in weight.

SUMMARY OF THE INVENTION

It is an object of this invention to provide a disk drive in which a frame plate is reduced in thickness while suppressing decrease in mechanical strength resulting from the reduction in thickness.

Other objects of this invention will become clear as the description proceeds.

A disk drive according to this invention comprises a frame plate having a principal surface on which a receiving portion for receiving a disk and a recording/reproducing unit for carrying out recording/reproducing operations onto and from the disk are provided.

According to an aspect of this invention, the frame plate comprises a metal thin plate and has a rear surface to which a thin reinforcing plate substantially equal in length and width to the frame plate is adhered.

BRIEF DESCRIPTION OF THE DRAWING

Referring to FIGS. 2 through 5, description will be made about a preferred embodiment of the present invention. Among various components of a magnetic disk drive, a loading mechanism for loading and unloading a magnetic disk in and out of a receiving space is omitted in FIG. 2 for simplicity of illustration. A frame plate 30 comprises a main plate with side walls 30-1 formed on both sides thereof and therefore has a U-shaped section. In this embodiment, all components are contained within an area surrounded by the frame plate 30. As will later be described, a main printed wiring board 31 and a subsidiary printed wiring board 40 are fixed by screws to the frame plate 30 at a portion close to the main plate of the frame plate 30. For the main printed wiring board 31, two supporting bases 30-2 are formed on the main plate of the frame plate 30 by cutting and bending corresponding parts thereof, as illustrated in FIG. 3. The main printed wiring board 31 is fixed on the two supporting bases 30-2 by screws 32. Use of the supporting bases 30-2 is required to keep a space between the lower surface of the main printed wiring board 31 and the main plate of the frame plate 30. This is because the lower surface of the main printed wiring board 31 serves as a mounting surface for electronic components or circuits.

Referring back to FIG. 2, a stepping motor 33 is formed on a rear wall 30-3 at a rear end of the frame plate 30. An output shaft 33-1 of the stepping motor 33 penetrates the rear wall 30-3. The output shaft 33-1 has a top end rotatably supported by a bearing 30-4a formed on the main plate of the frame plate 30 by cutting and bending a corresponding part thereof. The output shaft 33-1 has a threaded surface. A head carriage 34 has an arm 34-1 with a pin 34-2 planted thereon and engaged with the threaded surface of the output shaft 33-1. Therefore, the head carriage 34 is moved in parallel to an extending direction of the output shaft 33-1 following the rotation of the output shaft 33-1.

Figure 3:
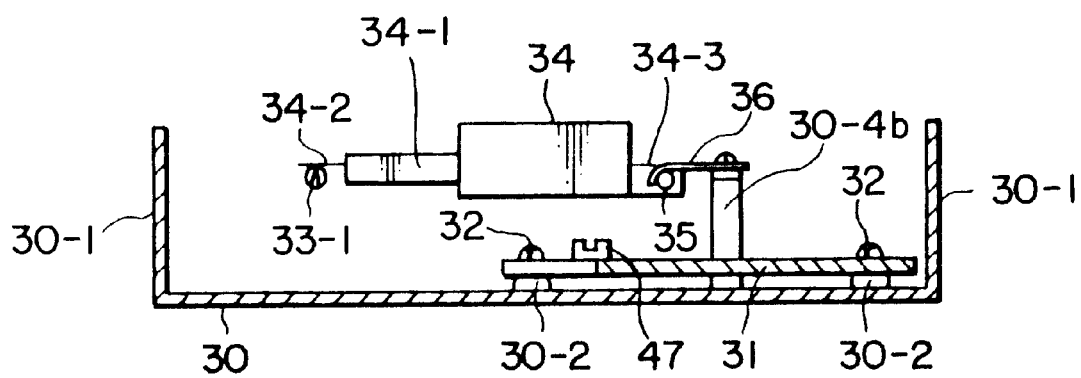
FIG. 3 is a sectional view taken along a line A-A' in FIG. 2.

The head carriage 34 has a U-shaped bearing arm 34-3 at the side opposite to the arm 34-1. The bearing arm 34-3 is penetrated by a guide bar 35. The guide bar 35 is held by a guide bar clamp 36. Therefore, the movement of the head carriage 34 following the rotation of the output shaft 33-1 is guided by the guide bar 35. As illustrated in FIG. 3, the guide bar clamp 36 is fixed to a supporting plate 30-4b by a screw. The supporting plate 30-4b is formed on the main plate of the frame plate 30 by cutting and bending a corresponding part thereof and is projected upward through a hole formed in the main printed wiring board 31.

The above-mentioned structure is advantageous in that, although the main printed wiring board 31 is fixed to the main plate of the frame plate 30 at its rear side, the head carriage 34 and a moving mechanism for moving the head carriage 34 can be arranged above the main printed wiring board 31. In case where no main printed wiring board 31 is present below the head carriage 34, a space below the head carriage 34 is available to accommodate other components. This improves the degree of freedom in a design stage.

Figure 2:
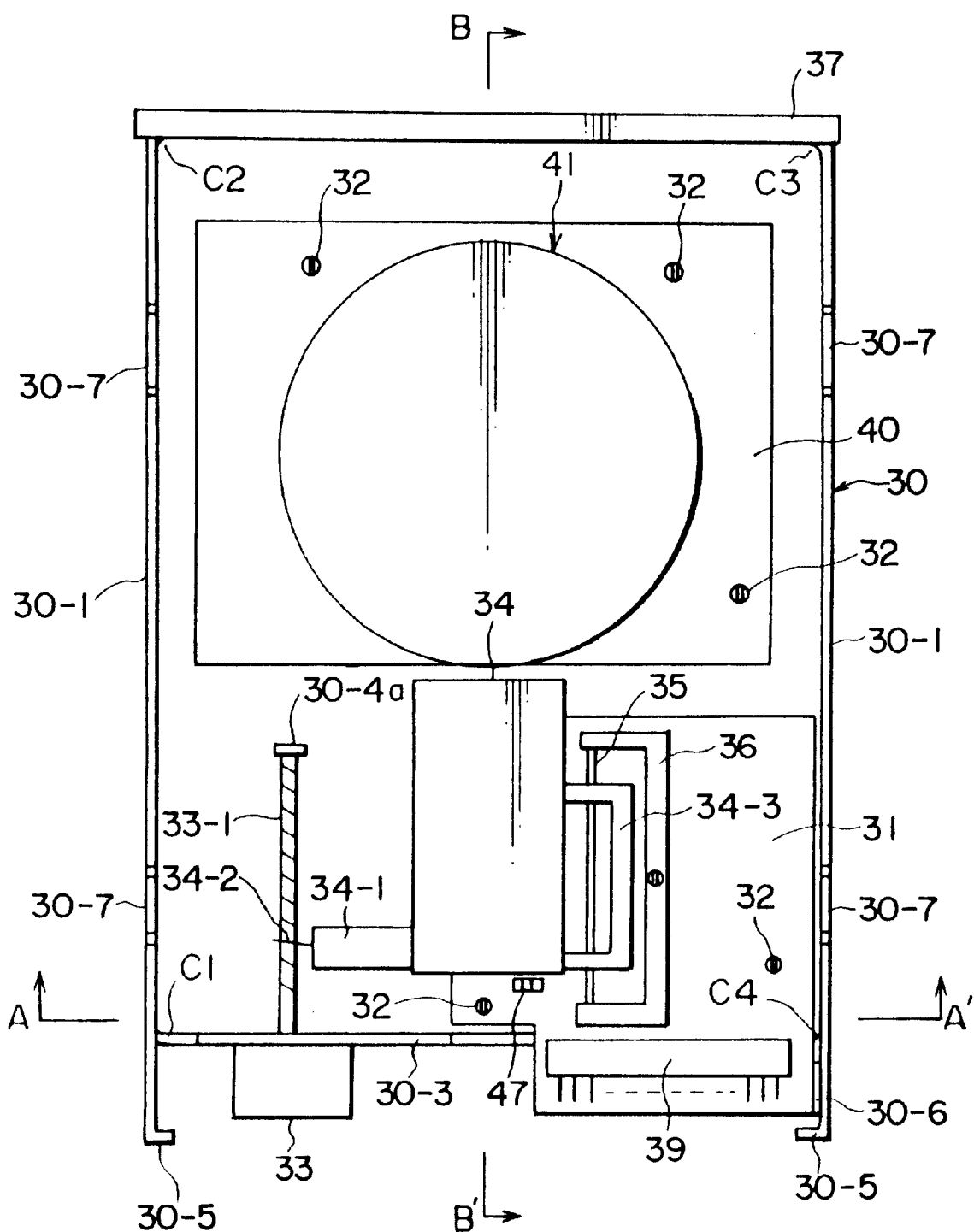
FIG. 2 is a plan view showing an internal structure of a magnetic disk drive according to the present invention.

Next, description will be made about the subsidiary printed wiring board 40. As for the subsidiary printed wiring board 40, a motor 41 for rotating the magnetic disk and other circuit components (not shown) are mounted on its upper surface alone, as is obvious from FIG. 4. Therefore, the subsidiary printed wiring board 40 is fixed by the screws 32 to be substantially in contact with the main plate of the frame plate 30 at the side nearer to an inlet of the magnetic disk, i.e., a front bezel 37 (FIG. 2).

The structure of the motor 41 will briefly be described. The motor 41 comprises a rotation shaft 41-1, a cylindrical center metal 41-2 which serves as a bearing, a plurality of stator cores 41-3 radially extending from the center, a plurality of stator coils 41-4 wound around top end portions of the stator cores 41-3, respectively, a ring-shaped permanent magnet 41-5 radially outwardly arranged to surround the stator cores 41-3, and a casing 41-6 rotatably holding the permanent magnet 41-5. In the motor 41 of the above-mentioned structure, the permanent magnet 41-5 and the casing 41-6 rotate together with the rotation shaft 41-1.

Figure 1:
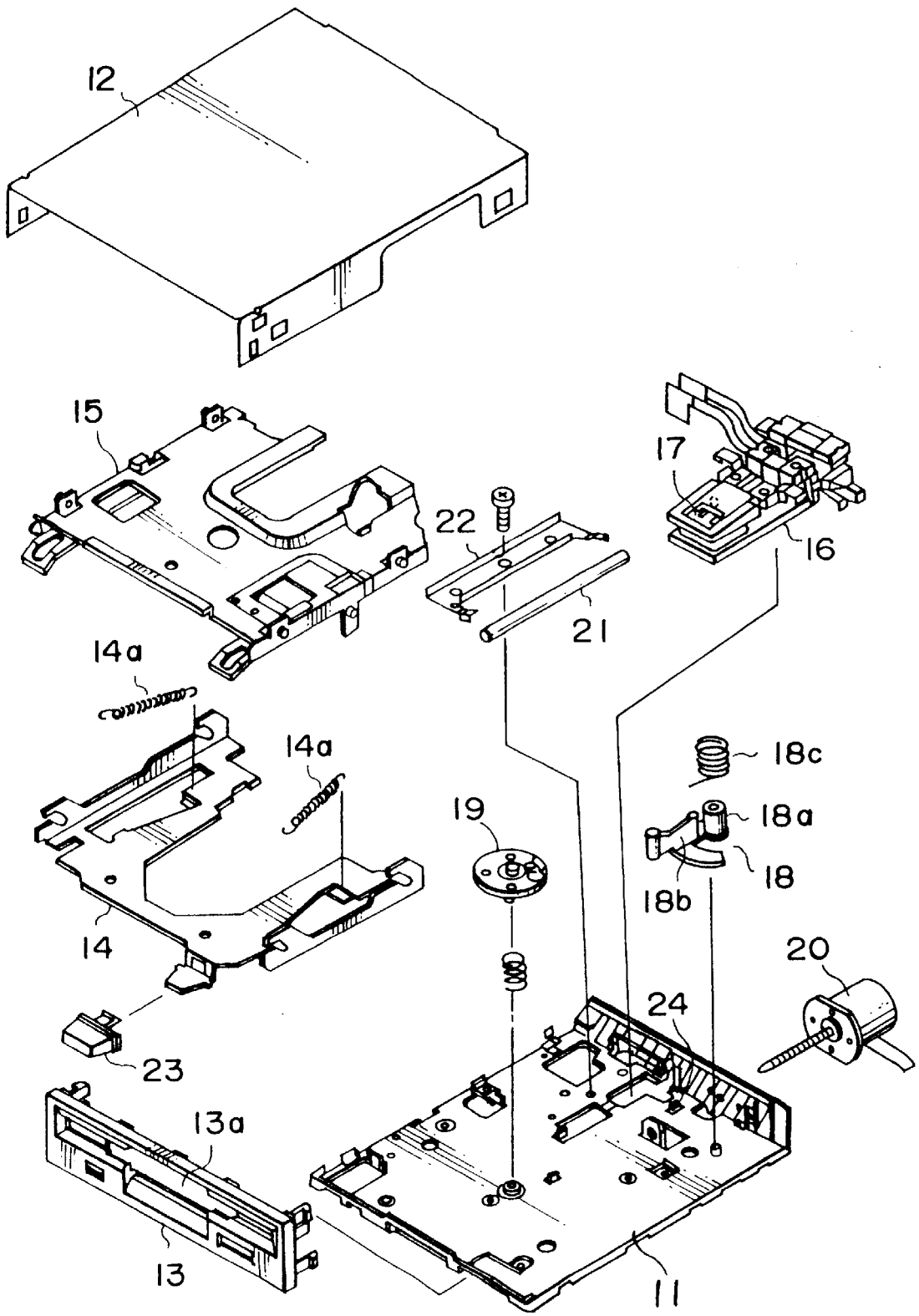
FIG. 1 is an exploded perspective view schematically showing an internal structure of a conventional magnetic disk drive.

The casing 41-6 has an upper flat portion 41-6a which has a function equivalent to the disk table 19 described in conjunction with FIG. 1. An arm 42 is rotatably attached to the lower surface of the flat portion 41-6a with its one end pivotally supported thereon. The arm 42 has the other end with a drive roller 43 rotatably held thereon. The flat portion 41-6a has a rectangular hole through which the drive roller 43 is projected upward. The magnetic disk received in the receiving space of the magnetic disk drive is put on the flat portion 41-6a. In this state, the drive roller 43 is inserted into a hole formed in a disk hub of the magnetic disk. When the casing 41-6 is rotated, the magnetic disk is rotated by the drive roller 43.

Above the motor 41, a loading mechanism for loading and unloading the magnetic disk into and out of the receiving space is assembled. Specifically, the loading mechanism includes an ejection plate 44 and a disk holder unit 45 corresponding to the ejection plate 14 and the disk holder unit 15 in FIG. 1, respectively. The frame plate 30 is coupled with a cover plate 38 to cover an internal cavity within the frame plate 30. The cover plate 38 covers an area between the front bezel 37 and the rear wall 30-3 illustrated in FIG. 2.

As described above, the frame plate 30 accommodates the main printed wiring board 31, the head carriage 34 and the associated mechanism for driving and guiding the head carriage 34, the subsidiary printed wiring board 40 with the driving mechanism for rotating the magnetic disk and the associated circuit, and the loading mechanism for loading and unloading the magnetic disk. Therefore, it is not necessary to provide another cover plate under the frame plate 30.

As will later be described, the frame plate 30 has a first opening 30a for receiving the center metal 41-2 and a second opening 30b for movably arranging the head carriage 34. The frame plate 30 also requires third and fourth openings 30c and 30d for electric adjustment of the electronic circuits mounted on the main printed wiring board 31 and the subsidiary printed wiring board 40, respectively.

Figure 4:
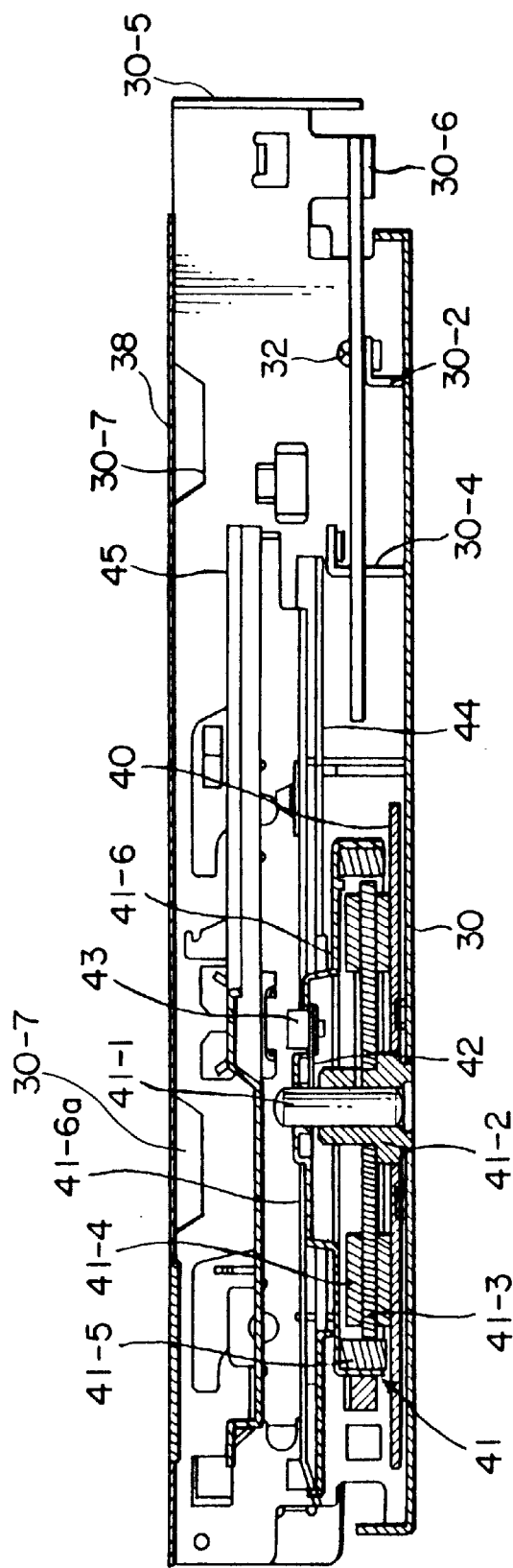
FIG. 4 is a sectional view taken along a line B-B' in FIG. 2.

Referring to FIGS. 2 and 4, the side walls 30-1 has extended portions extended rearward beyond the rearmost end of the frame plate 30. The rear ends of the extended portions are bent inward to form bent portions 30-5. The bent portions 30-5 are formed at positions behind the rear end of the stepping motor 33 and behind pin terminals of an interface connector 39 mounted on a rear portion of the main printed wiring board 31. The above-mentioned structure is effective in avoiding the following problem. It is assumed that the side walls 30-1 are terminated without extending beyond the rearmost end of the frame plate 30 and that no bent portions are formed. In this event, since the cover plate 38 is terminated at the rear wall 30-3, the stepping motor 33 and the pin terminals of the interface connector 39 are exposed and may possibly collide against something around, for example, a corner of a table to be damaged. Thus, the bent portions 30-5 serve as a protection member for the stepping motor 33 and the interface connector 39. In FIG. 4, the front bezel is not illustrated.

Furthermore, one of the side walls 30-1 that is adjacent to the main printed wiring board 31 has a bent portion 30-6 formed at a lower end of the rear portion thereof by bending a part of the lower end. The bent portion 30-6 serves as a supporting member supporting a projecting portion of the main printed wiring board 31 that is projected from the rearmost end of the frame plate 30.

In the present invention, the frame plate 30 is reduced in thickness from 1 mm to 0.8 mm, taking the reduction in total weight of the disk drive into consideration. With such a reduced thickness, the side walls 30-1 can easily be deformed in response to a pressure applied from the above through the cover plate 38. In order to avoid occurrence of the deformation, a plurality of notches 30-7 are formed in this embodiment at an upper edge of each of the side walls 30-1 with a space kept from one another in a longitudinal direction, as illustrated in FIG. 4. These notches 30-7 serves to distribute the pressure applied from the above through the cover plate 38. It is thus possible to avoid occurrence of deformation of the side walls 30-1.

Figure 5:
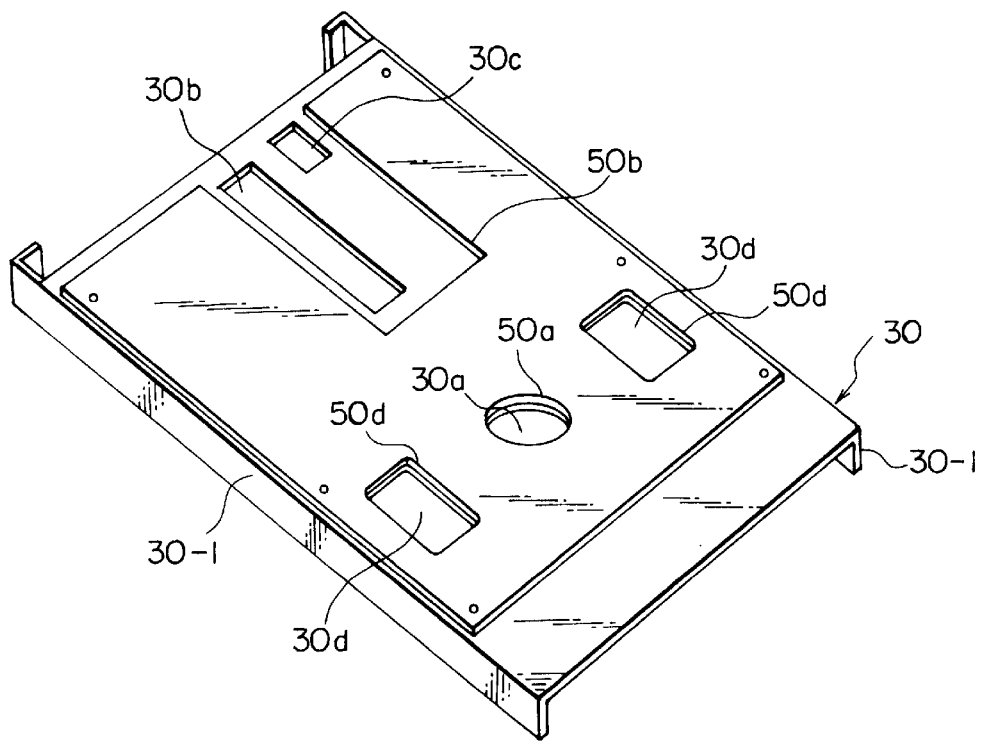
FIG. 5 is a perspective view of a frame plate illustrated in FIGS. 2 through 5 as seen from a rear side.

Referring to FIG. 5, the frame plate 30 used in the disk drive according to this invention is different in thickness from the frame plate 11 described in conjunction with FIG. 1. The disk drive of this invention has a thickness between 7 mm and 8 mm. The frame plate 30 is made of a sheet metal such as an aluminum plate and a steel plate and has a thickness not greater than 1 mm, for example, equal to 0.8 mm. To the lower surface of the frame plate 30, a reinforcing plate 50 is adhered, for example, by the use of an adhesive. The reinforcing plate 50 is made of a sheet metal such as an aluminum plate and a steel plate and has a thickness not greater than 1 mm, for example, equal to 0.4 mm. The reinforcing plate 50 has a width approximately equal to that of the frame plate 30 and a length slightly shorter than that of the frame plate 30. Therefore, the reinforcing plate 50 covers an almost entire area of the lower surface of the frame plate 30.

As described in the foregoing, the frame plate 30 is provided with the first opening 30a for receiving the center metal 41-2 and the second opening 30b for movably arranging the head carriage 34. The frame plate 30 further requires the third and the fourth openings 30c and 30d for electric adjustment of the electronic circuits mounted on the main and the subsidiary printed wiring boards 31 and 40, respectively. This is because the electric adjustment for the electronic circuits are executed from the lower surface of the frame plate 30 after the main printed wiring board 31 and the subsidiary printed wiring board 40 are attached to the frame plate 30. These openings can also be used in periodical maintenance.

In correspondence to the first through the fourth openings 30a through 30d, the reinforcing plate 50 is provided with openings 50a through 50d, respectively.

In the magnetic disk drive according to this embodiment, the frame plate 30 comprises a relatively thin plate with the reinforcing plate 50 adhered to the lower surface thereof. Therefore, the frame plate 30 is reinforced by the reinforcing plate 50 to be increased in strength. Thus, the frame plate 30 as a whole is hardly deformed and improved in shock resistance. The reduction in weight is achieved keeping the shock resistance equivalent to that of the conventional frame plate 11. Specifically, as compared with the conventional frame plate 11 having a thickness of 1.2 mm, the weight is reduced by about 15%.

In addition, the reinforcing plate 50 is provided with the openings formed at positions corresponding to those of the frame plate 30. Therefore, the areas of the frame plate 30 around the openings are reinforced so that the frame plate 30 is further improved in strength.

Figure 6:
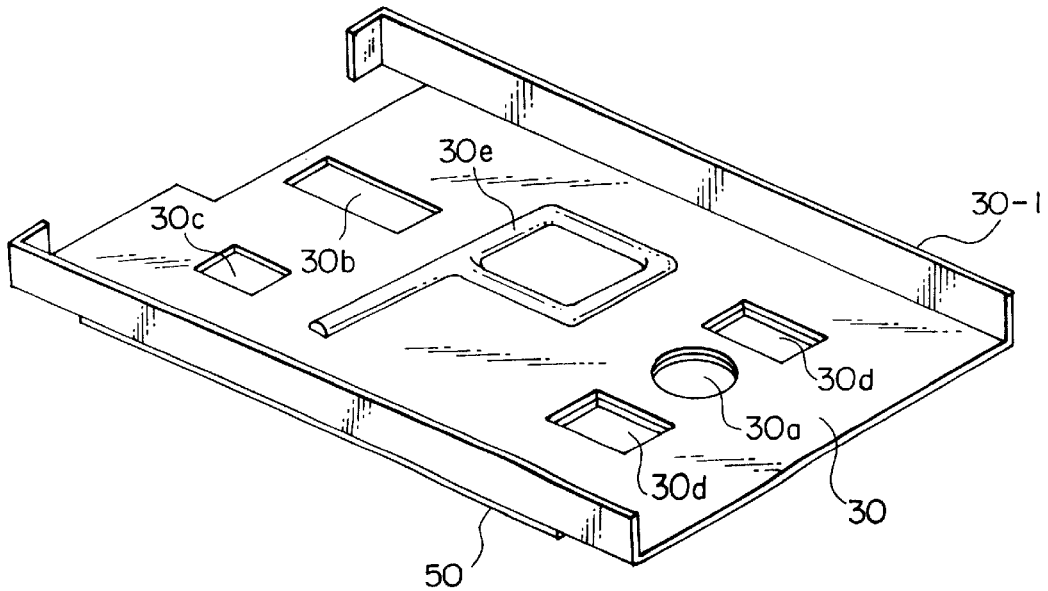
FIG. 6 is a perspective view of a modification of the frame plate illustrated in FIG. 5.

Referring to FIG. 6, a modification of the frame plate 30 will be described. In FIG. 6, the reinforcing plate 50 is adhered onto the lower surface of the frame plate 30 in the manner similar to that described in conjunction with FIG. 5. On the other hand, on the upper surface of the frame plate 30, a bead portion 30e is formed. The bead portion 30e is formed by deforming a part of the main plate of the frame plate 30, for example, by half-blanking or bending and serves to increase the strength of the main plate of the frame plate 30. With this structure, the frame plate 30 is increased in strength not only by the reinforcing plate 50 but also by the bead portion 30e.

Adhesion of the reinforcing plate 50 to the lower surface of the frame plate 30 may be carried out by welding or caulking instead of use of the adhesive in each of the embodiments described above. Although the magnetic disk drive is described in the foregoing, this invention is also applicable to any other disk drive, for example, to a magnetooptic disk drive.

What is claimed is:

1. A disk drive for carrying out data writing/reading operations onto and from a flexible magnetic disk and a magnetooptic disk, said disk drive comprising:

a frame plate structure having a principal upper surface on which a receiving portion for receiving a disk and a recording/reproducing unit for carrying out recording/reproducing operations onto and from said disk are provided;

wherein said frame plate structure comprises:

a thin metal plate having a thickness of about 0.8 mm and a rear or lower surface;

a thin reinforcing plate substantially equal in length and width to said frame plate structure, said thin reinforcing plate having a thickness of about 0.4 mm and being adhered to said rear or lower surface of said thin metal plate by use of an adhesive; and a reinforcing bead formed on said principle upper surface of said frame plate structure to increase the strength of said frame plate structure;

wherein a printed wiring board is mounted on said principal upper surface or the rear surface of said frame plate structure;

wherein said printed wiring board includes a signal processing circuit comprising a plurality of electronic components for said recording/reproducing unit, a motor for rotating said disk, and a drive circuit for driving said motor;

wherein said thin metal plate is provided with at least one first opening to enable access to at least one of said electronic components from a side of the rear surface of said frame plate structure for the purpose of electric adjustment, and a second opening for holding a bearing portion of said motor; and wherein said thin reinforcing plate is provided with openings formed at positions corresponding to said at least one first opening and said second opening of said thin metal plate.

2. A disk drive as claimed in claim 1, wherein said thin reinforcing plate has a length which is slightly shorter than the length of said thin metal plate.

3. A disk drive as claimed in claim 2, wherein said thin reinforcing plate covers almost the entire area of the rear surface of said thin metal plate.

4. A disk drive as claimed in claim 1, wherein said thin reinforcing plate covers almost the entire area of the rear surface of said thin metal plate.

5. A disk drive as claimed in claim 1, wherein said reinforcing bead is formed in a substantially central area of said frame plate structure.

6. A disk drive as claimed in claim 5, wherein said reinforcing bead is formed by deforming a portion of said frame plate structure.

7. A disk drive as claimed in claim 6, wherein said reinforcing bead comprises an upwardly bent portion of said frame plate structure which projects upwardly from said thin metal plate.

8. A disk drive as claimed in claim 1, wherein said reinforcing bead is formed by deforming a portion of said frame plate structure.

9. A disk drive as claimed in claim 8, wherein said reinforcing bead comprises an upwardly bent portion of said frame plate structure which projects upwardly from said thin metal plate.

10. A disk drive as claimed in claim 8, wherein said reinforcing bead is formed in a substantially central area of said thin metal plate.

11. A disk drive as claimed in claim 10, wherein said reinforcing bead is formed by deforming a portion of said thin metal plate.

12. A disk drive as claimed in claim 11, wherein said reinforcing bead comprises an upwardly bent portion of said thin metal plate which projects upwardly from said thin metal plate.

13. A disk drive as claimed in claim 1, wherein said reinforcing bead is formed by deforming a portion of said thin metal plate.

14. A disk drive as claimed in claim 13, wherein said reinforcing bead comprises an upwardly bent portion of said thin metal plate which projects upwardly from said thin metal plate.

15. A disk drive as claimed in claim 1, wherein said reinforcing bead is formed on at least the upper surface of said frame plate structure.

16. A disk drive as claimed in claim 15, wherein said reinforcing bead projects upwardly from the upper surface of said frame plate structure.

17. A disk drive as claimed in claim 16, wherein said reinforcing bead comprises an upwardly bent portion of said frame plate structure.

* * * * *